Aug. 18, 1953  D. T. JONES ET AL  2,649,043
STRING EXTRACTOR MEANS FOR BALING APPARATUS
Filed Aug. 16, 1949  5 Sheets-Sheet 4

Inventors
DAVID THOMAS JONES AND
GLYNN JONES
By Linton and Linton
Attorneys

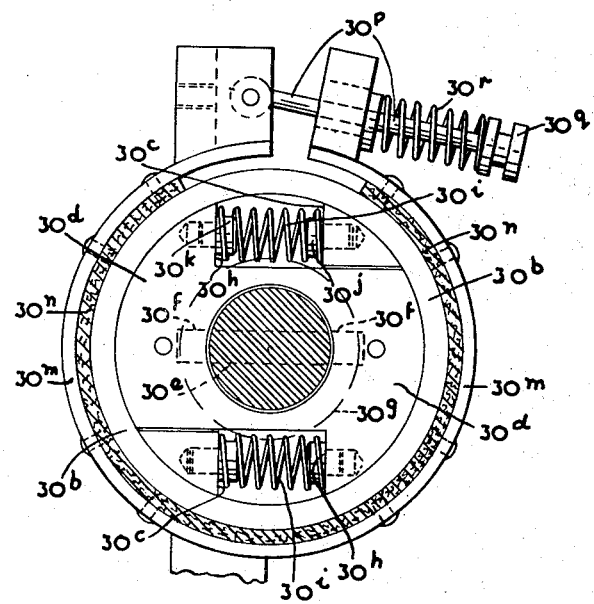

UNITED STATES PATENT OFFICE 2,649,043

STRING EXTRACTOR MEANS FOR BALING APPARATUS

David Thomas Jones and Glynn Jones, Mold, North Wales

Application August 16, 1949, Serial No. 110,484
In Great Britain August 19, 1948

7 Claims. (Cl. 100—4)

This invention relates to automatic baling apparatus, and more particularly, although, of course, not exclusively, to apparatus of travelling pick-up type as described in the specification of our prior British Patent No. 615,876 dated August 17, 1946; and has for its object to improve the efficiency of the knotting or tying mechanism thereof (hereinafter, for convenience of description, referred to as "knotter" or "knotters") by the provision of simple and robust string extractor means which enables the former to operate successfully when the machine is making bales (of hay, straw, or other material) of a higher density than has heretofore been found practicable, thereby enhancing the output capacity of the apparatus.

Conventional automatic baling apparatus usually comprises a baling chamber wherein material is compressed by a reciprocable ram, a pair of knotters mounted on a breastplate of said chamber, and a string-carrying needle in respect of each knotter, said needle being adapted to swing through slots in the floor and breastplate of the baling chamber to position string held by retainer devices of said knotters around a completed bale, in order that it may be tied by said knotters.

Difficulty has hitherto been experienced in the use of such apparatus when making highly compressed bales, due, primarily, to the fact that the pressure between completed bales still within the baling chamber of the apparatus and a new bale being made is such as to frequently prevent the required movement of string, twine, or other material used for tying purposes (all hereinafter for convenience of description referred to as "string") therebetween, with a result that the end of said string is pulled from the knotter's retainer, or the string becomes broken.

To overcome this and other disadvantages, baling apparatus, according to our invention, includes means whereby, in respect of each knotter (there being usually two) and after the completion of one bale and before the commencement of the next succeeding bale, a length of string is extracted from the string containers of the baler to obviate necessity for said string to be pulled between the completed bale and the new bale during the making of the latter.

In a preferred embodiment of our invention, which is described in relation to an individual knotter, we provide a cam-actuated arm pivoted on a shaft disposed adjacent to the knotter's driving shaft, and said arm having at its outer end an angled portion or foot adapted to be positioned transversely of the adjacent breastplate slot in order to engage the string passing therethrough in the path of a bale-in-making. Said arm is arranged to pivot on its shaft away from the breastplate each time the string-carrying needle of the knotter swings through the baling chamber (during the tying of a completed bale) in order to position a length of string in the path of a new bale. The pivoting of said arm takes place in a direction opposite to that in which the knotter needle swings, and there is thus initially extracted from the respective string box an additional length of string. As the new bale is formed and moves through the baling chamber, the loop of string held by said pivoted arm is gradually taken up and said arm is retracted or pivoted, against the resistance of a brake, to its original position when the knotted mechanism is tripped, preferably by the arrival in its original position of said arm. The knotter needle swings through the baling chamber around the now-completed bale to permit of the tying operation. When said arm is fully retracted, the angled portion thereof is in a position which locates the string correctly for manipulation by the knotter, and this enables the conventional breastplate tucker arm, and its drive from the knotter, to be omitted.

We will further describe our invention with the aid of the accompanying explanatory drawings which illustrate, by way of example only and not of limitation, one mode of embodying same.

Figure 4:
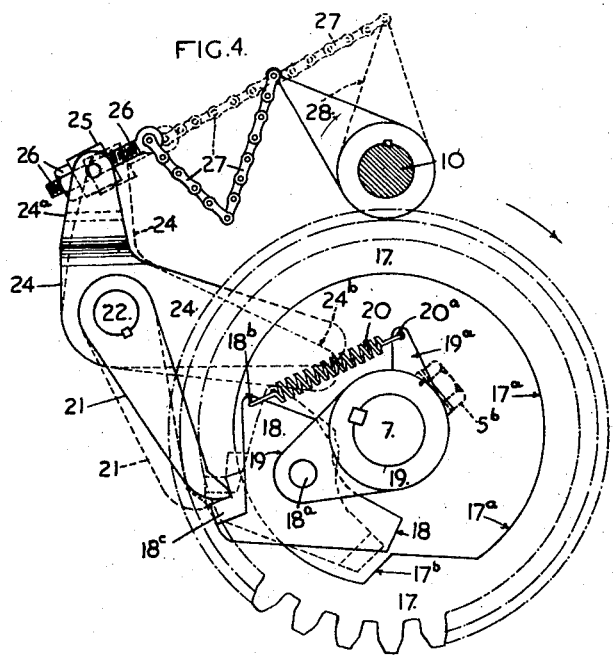

Fig. 4 a fragmentary view showing the knotter drive and trip mechanism.

Figures 5, 6:
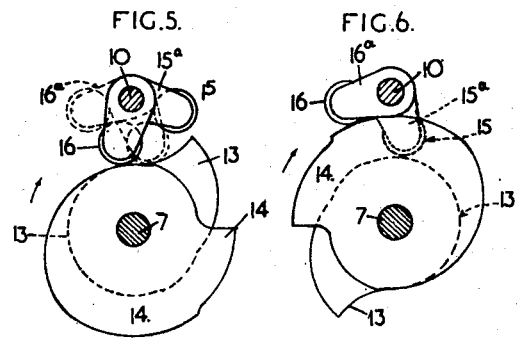

Figs. 5 and 6 are detached views of the actuating cams and followers.

Fig. 7 is a detached view of a spring influenced brake with cover plates removed to show internal construction.

Figure 1:
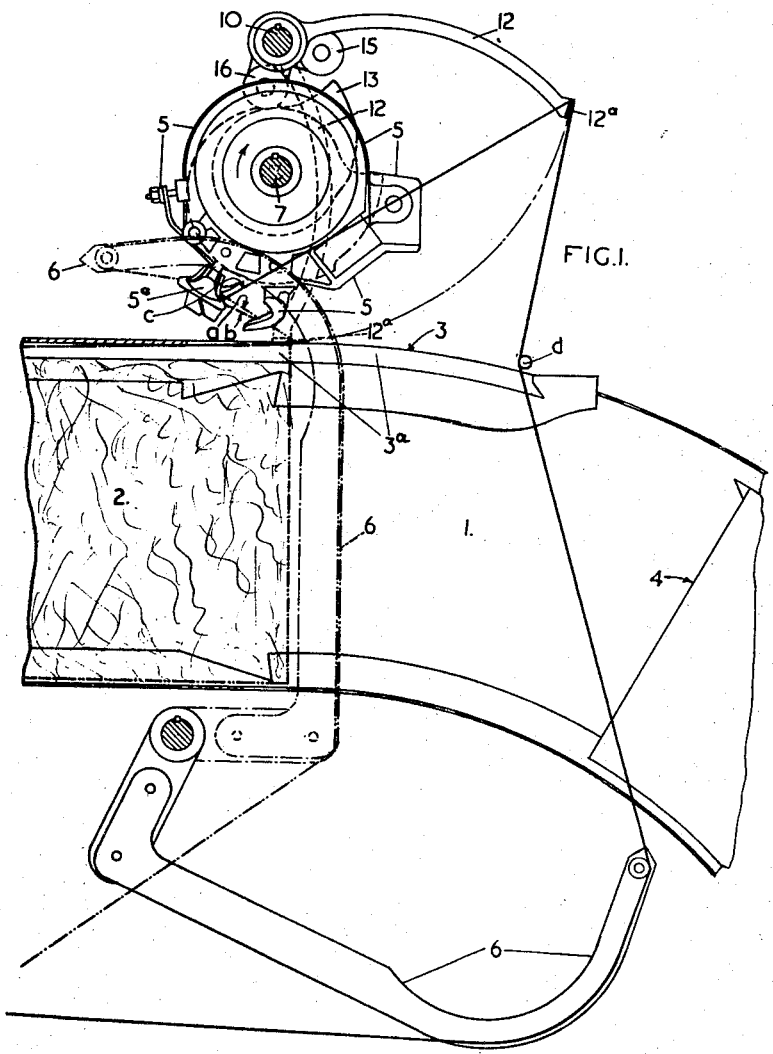
Fig. 1 is a sectional side view of the relevant parts of baling apparatus incorporating the invention.
Figure 2:
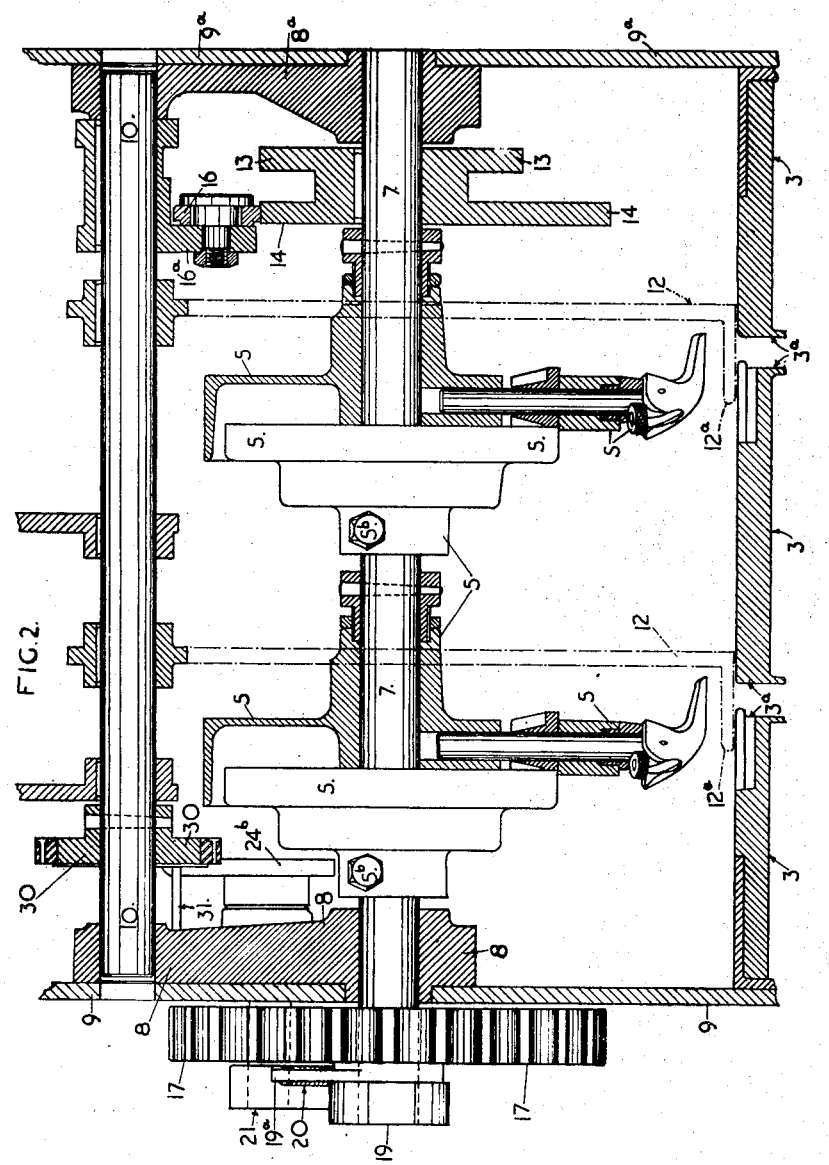
Fig. 2 is a part sectional view of the knotter and string extractor means drawn to an enlarged scale as compared with the preceding view, and taken at right angles thereto.

Referring now to said drawings, 1 (Fig. 1) denotes the baling chamber, 2 the baling chamber extension, 3 the breastplate, 4 the baling ram, 5, 5 the knotters, and 6 the string-carrying needle of one of said knotters all of a baling machine of more or less conventional type. Said knotters 5, 5 are mounted upon breastplate 3 above baling chamber 1 and the knotter's driving shaft 7 is journalled in bearing brackets 8, 8ª secured to side plates 9, 9ᵃ of the baling machine by means of bolts 8ᵇ and 8ᶜ. Also journalled in brackets 8, 8ᵃ is a shaft 10 disposed above and parallel to shaft 7, whereto are keyed—there being one in respect of each knotter 5—a pair of string extractor arms 12, 12 provided at their outer ends with angled portions or feet 12ᵃ adapted, when required, to be positioned transversely of conventional slots 3ᵃ, 3ᵃ of breastplate 3. Actuation of arms 12 during operation of the baling machine is effected by means of two edge cams secured to shaft 7, one cam 13 being contoured to lift arms 12, whilst the other cam 14 is adapted to control the lifting movement of said arms and, if necessary, to return them to lowered positions. Two follower rollers, 15, 16 are, respectively, in engagement with cams 13, 14, and are carried at the ends of arms 15ᵃ, 16ᵃ which are at right angles to each other on shaft 10.

Figure 3:
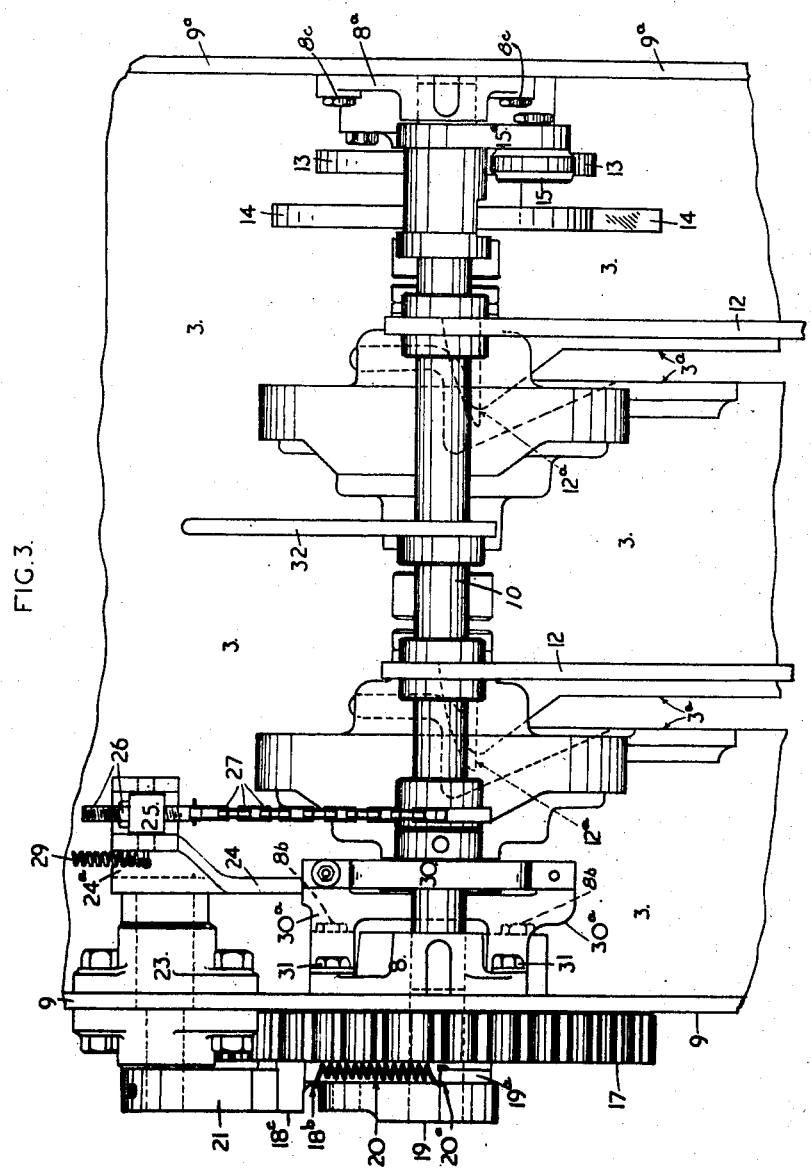
Fig. 3 is a plan of Fig. 2.

In use, and following upon the actuation of trip mechanism hereinafter described, shaft 7 makes one complete revolution to operate knotters 5 (with their needles 6 and extractor arms 12) each time a bale is completed, i. e. has reached required dimensions. The required positions of needle 6 and its respective arm 12 for the knotting operation to be carried out is indicated by broken lines in Fig. 1. The position of the string being tied around a completed bale is shown in chain-dot line. During the knotting, in known manner, of the two ends $a$, $b$ of said string held by a retainer 5ᵃ of knotter 5, both of conventional construction, arm 12 remains stationary and foot 12ᵃ thereof is located partly across (as shown in broken lines in Fig. 3) the adjacent breastplate slot 3ᵃ to position said string ends $a$, $b$ correctly for manipulation by knotter 5. During the knotting operation needle 6 swings downward through the slots of the baling chamber, and arm 12 actuated by cam 13 through follower 15 is raised rapidly away from breastplate 3 to the position shown in full line, Fig. 1. When arm 12 has reached its uppermost position, it is arranged for follower 16 to be contacted by an appropriately contoured edge portion of cam 14 in order to prevent any free movement or "kick" of said arm. The downward movement of needle 6 positions a length of string (the end $c$ whereof is held by retainer 5ᵃ) in the path of the new bale, said string passing over the foot 12ᵃ of upraised arm 12 as indicated in full line Fig. 1.

There is thus provided above the baling chamber a length of string stretching from the point $c$, where it is held by retainer 5ᵃ to a protection roller $d$, and which string is approximately equal to the length of a bale. During the building up of the new bale by successive strokes of ram 4 the compressed material is forced along the baling chamber, carrying with it the string in its path which is thus held between the newly compressed material and the last completed bale. String for the bottom of the bale is drawn, as the size of the bale increases, without hindrance (from the string box, not shown) over needle 6, and string for the top of the bale is taken from that held by upraised arm 12. The latter is thus pivoted gradually downward as the size of the bale increases until it finally reaches its original position, as shown in dotted line Fig. 1. This downward movement of arm 12 is resisted by a friction brake generally designated 30 mounted upon shaft 10, and having an outer band 30ᵐ is secured by means of a bracket 30ᵃ and bolts 31 to the upper portion of bearing bracket 8.

Brake 30 as shown most clearly in Fig. 7, includes a ring member 30ᵇ formed or provided on its inner surface with two opposed stops 30ᶜ, and disposed within ring member 30ᵇ so as to turn therein is a component 30ᵈ centrally drilled to fit on shaft 10 and being locked thereto by means of a pin 30ᵉ passed through apertures 30ᶠ of a boss 30ᵍ formed on one side of component 30ᵈ and through shaft 10. Component 30ᵈ has two stop portions 30ʰ as illustrated, and between said stops 30ʰ and the stops 30ᶜ of ring member 30ᵇ are disposed helical compresesion springs 30ⁱ located on studs 30ʲ and 30ᵏ. Said brake band 30ᵐ with friction lining 30ⁿ embraces ring component 30ᵇ and the pressure exerted by said band 30ᵐ is adjustable by means of a swivel bolt 30ᵖ, with nut 30ᵠ and compression spring 30ʳ, which connects the free ends of band 30ᵐ.

It will be seen that springs 30ⁱ will permit arm 12 a certain amount of downward movement under the pull of the engaged string before any slip occurs between ring member 30ᵇ and brake band 30ᵐ. By these means, slack which tends to appear in the string held by arm 12 (due to expansion of the material in the baling chamber between working strokes of ram 4) is taken up by spring 30ⁱ which imparts a slight upward movement to said arms. It will, of course, be understood that, although in the foregoing description reference has been made to one knotter only with its respective needle 6 and arm 12, during operation of the baling machine both knotters and associated mechanisms operate simultaneously and in identical manner.

The drive to knotter shaft 7 is taken from a spur wheel 17 (Fig. 4) which, during operation of the baler, is rotated continuously—from the main drive (not shown) of the baler—about shaft 7 upon which it is freely mounted exteriorly of side plate 9. Spur wheel 17 is arranged to drive shaft 7 and so actuate knotters 5, 5 by means of a pawl 18 pivoted at 18ᵃ to a driving dog 19 keyed to shaft 7. Said pawl 18 is continuously urged toward engagement with a stepped portion 17ᵇ formed as illustrated in flange 17ᵃ of spur wheel 17 by a tension spring 20, one end of which latter is anchored at 20ᵃ to an arm 19ᵃ of dog 19, and the other end thereof is secured to pawl 18 at 18ᵇ. A detent arm 21 keyed to a stub shaft 22 journalled in bearings 23 of side plate 9 is adapted to engage a catch piece 18ᶜ of pawl 18 and to maintain the latter, against the resistance of spring 20, out of engagement with step 17ᵇ of spur wheel 17. Also keyed to stub shaft 22 is a crank member 24 to the upper arm 24ᵃ whereof is pivoted a block 25 whereto is adjustably secured, by means of a bolt 26 with nut 26ᵃ, one end of a chain 27. The other end of chain 27 is secured to the end of a trip lever 28 keyed to shaft 10. A tension spring 29 (Fig. 3) is also attached to arm 24ᵃ and, being anchored to a convenient portion of the baler frame, normally maintains detent arm 21 of stub shaft 22 in the path of, or in engagement with, catch piece 18ᶜ of pawl 18 as illustrated in full line Fig. 4.

It will be seen that when extractor arms 12 are raised, trip lever 28 being keyed to shaft 10 will move to the position illustrated, chain 27 will be slack, and crank member 24 will, under the influence of spring 29, turn stub shaft 22 to effect engagement of lever 21 with catch-piece 18ᶜ of pawl 18. In the unlikely event of spring 29 failing to move arm 21 into engagement with pawl 18, the head of a bolt 5ᵇ of the adjacent knotter 5 is arranged to contact lower arm 24ᵇ of crank member 24 and so effect the required movements.

Pawl 18 will thus be pivoted clear of step 17ᵇ of spur wheel 17 which will rotate freely upon knotter driving shaft 7. When, however, arms 12 reach their lowermost position (as in dotted line Fig. 1) the consequential tightening of chain 27 causes disengagement of detent lever 21 from catch-piece 18ᶜ and the engagement of pawl 18 with step 17ᵇ of spur wheel 17 which thus drives shaft 7 to operate knotters 5. At the end of one revolution of shaft 7, arms 12 are again in raised position due to rotation of cam 13 with shaft 7, and pawl 18 is disengaged from step 17ᵇ.

Knotters 5 and their associated mechanism are thus caused to come into operation each time the string held by arm 12 has been taken up by the movement of a bale-in-making through the bailing chamber, and at no time is string pulled between said bale-in-making and the last completed bale. Tension in said string is, therefore, reduced to a minimum and likelihood of its being pulled from retainer 5ᵃ, or of its being broken, is obviated.

Referring now more particularly to Figs. 5 and 6 and to the relative contouring of cams 13 and 14, it will be appreciated that as there is no movement of said cams during the operative pivoting to lowermost retracted position of arms 12 on shaft 10, follower 16 will be in a raised position and clear of cam 14 (as shown in dotted line Fig. 5) when the knotting operation commences. The profile of cam 14 is such that, after approximately 180° movement (Fig. 6), it contacts follower 16 and ensures that arms 12 are in fully retracted position for a knotting operation to commence. It is also arranged that cam 13, during said knotting operation, shall impart a slight initial lift to follower 15, so that the feet 12ᵃ of arms 12 move slightly to the right (as viewed in Fig. 1) in order to position the string which is then positioned thereover by needle 6, and held at c, clear of the knotter mechanism as it operates to complete the knotting of the ends a, b of the string around a completed bale.

In the unlikely event of both strings breaking, due to a flaw in their construction, the knotter trip mechanism may be hand-actuated by a handle lever 32 secured to shaft 10, and by means of which said shaft 10 can be rotated; and so long as the breakages do not occur between needles 6 and the string boxes, not shown, said needles will present the string in a position whereby it will be gripped as at c by knotter retainer 5ᵃ and a new bale will be formed. Should one string only break, the engagement of the unbroken string over one of said arms 12 is sufficient to cause retraction of said arms to the position required to trip and operate knotters 5: the broken string will then be retained by the appropriate knotter and a new bale formed in normal manner.

What we claim as our invention and desire to secure by Letters Patent is:

1. Baling apparatus of the type referred to having knotters, a driving shaft for said knotters, and knotter needles swingable through slots in a bailing chamber, provided with means whereby, in respect of each knotter of said bailing apparatus and after the completion of one bale and before the commencement of the next succeeding bale, a length of string is extracted from a supply of said string, said extracting means comprising a shaft disposed adjacent to the shaft of said knotters, extractor arms keyed to said second-mentioned shaft and having angled portions at their outer ends each adapted to be positioned transversely of an adjacent baling chamber slot in order to engage the string positioned in the path of a bale-in-making, arms secured to said extractor arm shaft, follower rollers carried at the ends of said second-mentioned arms, and cams mounted on said knotter driving shaft for turning therewith for engaging said followers and pivotally raising said extractor arms away from the baling chamber each time the knotter needles swing through the slots of the bailing chamber to position lengths of string in the path of a new bale, and whereby a length of string approximately equal to the length of a completed bale is held by each arm above the baling chamber.

2. Baling apparatus as claimed in claim 1 wherein a spring loaded friction brake locked to a side plate of the apparatus is mounted on the extractor arm shaft for resisting rotation of said extractor arm shaft.

3. Baling apparatus as claimed in claim 1 wherein one of said cams is a lift cam whereby said extractor arms are raised, and the other a return cam for ensuring that said extractor arms are fully retracted on the completion of each bale.

4. Baling apparatus as claimed in claim 1 wherein one of said cams is a lift cam whereby said extractor arms are raised, and the other a return cam for ensuring that said extractor arms are fully retracted on the completion of each bale with said return cam being contoured to prevent free movement of said extractor arms at the top of their raised positions.

5. Baling apparatus as claimed in claim 1 wherein one of said cams is a lift cam whereby said extractor arms are raised, the other a return cam for ensuring that said extractor arms are fully retracted on the completion of each bale with said return cam being contoured to prevent free movement of said extractor arms at the top of their raised positions, and said lift cam is profiled to impart to the extractor arms a small initial movement prior to the raising of said arms to their uppermost position.

6. Baling apparatus as claimed in claim 1, including a spur wheel revoluble on the knotter shaft and adapted to be driven continuously, a driving dog keyed to said knotter shaft, a pawl pivoted on said driving dog, a stepped portion formed on the flange of said spur wheel, a spring for urging said pawl into engagement with said stepped flange portion of the spur wheel, a stub shaft journalled in a side plate of the apparatus, a detent arm keyed to said stub shaft for engaging a catch piece of said pawl to normally maintain the latter out of engagement with the stepped flange of the spur wheel, a cranked member keyed to said stub shaft, a trip lever keyed to the extractor arm shaft, and a connection between the upper end of said cranked member and said trip lever whereby is caused locking of the knotter shaft with said spur wheel when the extractor arms are in fully retracted position on the completion of a bale and unlocking of said knotter shaft from said spur wheel when the extractor arms are in raised position.

7. For use in combination with baling apparatus of the type referred to, string knotting mechanism having knotters and a driving shaft therefore, and string extracting mechanism, including a shaft disposed adjacent the driving shaft of the knotting mechanism, a string extractor arm in respect of each knotter of said knotting mechanism keyed to said second-mentioned shaft, angled foot portions at the outer ends of said extractor arms adapted to engage string positioned in the path of a bale-in-making, arms secured to said second-mentioned shaft, follower rollers carried at the ends of said second-mentioned arms, cams mounted on said knotter driving shaft and turning therewith for engaging said followers and raising the extractor arms each time the knotter needles position lengths of string in the path of a new bale, a spur wheel revoluble on the knotter driving shaft and adapted for continuous rotation, detent means for causing said spur wheel to become locked to said knotter shaft, and a trip lever keyed to said extractor arm shaft for actuating said detent means and causing locking of said knotter shaft with said spur wheel when the extractor arms are retracted, and unlocking of said knotter shaft from said spur wheel when the extractor arms are raised.

DAVID THOMAS JONES.
GLYNN JONES.

References Cited in the file of this patent
UNITED STATES PATENTS

| Number | Name | Date |
| --- | --- | --- |
| 764,318 | Towner | July 5, 1904 |
| 808,153 | Heldt | Dec. 26, 1905 |
| 1,008,767 | Young | Nov. 14, 1911 |
| 2,405,688 | Crumb | Aug. 13, 1946 |
| 2,470,724 | Ronning et al. | May 17, 1949 |

FOREIGN PATENTS

| Number | Country | Date |
| --- | --- | --- |
| 705,457 | Germany | Apr. 29, 1941 |